United States Patent
Hirakata (10) Patent No.: US 6,191,833 B1
(45) Date of Patent: Feb. 20, 2001

(54) LIQUID CRYSTAL DISPLAY DEVICE HAVING REFLECTION FILM BETWEEN PRISM SHEET AND LIQUID CRYSTAL PANEL

(75) Inventor: Junichi Hirakata, Chiba (JP)

(73) Assignee: Hitachi, Ltd., Tokyo (JP)

( * ) Notice: Under 35 U.S.C. 154(b), the term of this patent shall be extended for 0 days.

(21) Appl. No.: 09/464,196

(22) Filed: Dec. 16, 1999

(30) Foreign Application Priority Data

Dec. 24, 1998 (JP) .................................................. 10-367070

(51) Int. Cl.[7] .................................................. G02F 1/1335
(52) U.S. Cl. .................................. 349/61; 349/62; 349/64; 349/137
(58) Field of Search .................................. 349/61, 62, 64, 349/137

(56) References Cited

U.S. PATENT DOCUMENTS

| | | | |
|---|---|---|---|
| 4,874,228 | * 10/1989 | Aho et al. | 350/345 |
| 5,408,344 | * 4/1995 | Takiguchi et al. | 359/40 |
| 5,600,462 | * 2/1997 | Suzuki et al. | 349/112 |
| 5,686,979 | * 11/1997 | Weber et al. | 349/96 |
| 5,764,322 | * 6/1998 | Mamiya et al. | 349/65 |
| 5,946,062 | * 8/1999 | Hasegawa et al. | 349/58 |
| 5,986,737 | * 11/1999 | Evanicky et al. | 349/137 |
| 6,075,649 | * 6/2000 | Naito | 359/619 |
| 6,104,454 | * 8/2000 | Hiyama et al. | 349/65 |

* cited by examiner

Primary Examiner—Kenneth Parker
Assistant Examiner—Mike Qi
(74) Attorney, Agent, or Firm—Antonelli, Terry, Stout & Kraus, LLP (57) ABSTRACT

A liquid crystal display device with a back-light unit excellent in viewing characteristics while improving the use efficiency of rays of light emitted therefrom is provided. The device includes at least a liquid crystal panel including a liquid crystal layer as sandwiched between a pair of spatially opposed substrates at least one of which has electrodes thereon, an upper polarization plate and lower polarization plate laid out to retain the liquid crystal panel therebetween, an illumination light source in the from of a back-light device for use in illuminating the liquid crystal panel from the back side thereof, and a prism sheet provided at an upper surface of the back-light device, wherein a total reflection film is inserted between the liquid crystal panel and the back-light device so as to reflect light from the prism sheet which is reflected in the prism sheet.

14 Claims, 11 Drawing Sheets

LIQUID CRYSTAL DISPLAY DEVICE HAVING REFLECTION FILM BETWEEN PRISM SHEET AND LIQUID CRYSTAL PANEL

BACKGROUND OF THE INVENTION

1. Field of the Invention

The present invention relates to high-brightness liquid crystal display devices that are high in optical use efficiency and excellent in viewing-angle characteristics.

2. Description of the Related Art

Liquid crystal display devices are widely used as those devices for use in visually displaying a variety of kinds of images including still images and video images.

Such liquid crystal display devices of this type are basically arranged so that two (a pair of) substrates at least one of which is made of transparent glass or else are spatially stacked over each other with a liquid crystal layer sandwiched between them to thereby constitute a so-called liquid crystal panel, which devices are classified into two forms, one of which is for performing turn-on/off operations of a specified picture element or "pixel" by selective application of a voltage to various electrodes as formed on the substrate of the above-noted liquid crystal panel to constitute the pixel, and the other of which is for performing turn-on/off operations of certain pixel by forming an active element for pixel selection along with the various electrodes and then selecting this active element.

Especially the liquid crystal display devices of the latter type are called active-matrix devices, which offer several technical advantages including increased contrast performance and high-speed displayabilities or the like and, for the very reason, are inevitable as "de facto standard" display modules among presently available liquid crystal display devices.

Prior known active-matrix liquid crystal display devices include those of what is called the "vertical electric field" scheme for applying between an electrode formed on one substrate and an electrode formed on the other substrate an electric field for use in changing the optical orientation or alignment direction of the liquid crystal layer, and others of the so-called "lateral electric field" scheme (also known as in-plane switching type or "IPS" scheme) for letting the direction of an electric field being applied to the liquid crystal layer extend in substantially parallel to substrate surfaces.

The various types of liquid crystal display devices are each designed to include a light source device (generally called a "back-light" unit) for illumination of the liquid crystal panel from the back side thereof. Currently available back-light unit typically include those of the side-edge scheme with more than one lamp (linear light source such as a fluorescent tube or light-emitting diode) disposed on the lateral side of a light guide plate used, and others of the direct downward scheme with a lamp disposed immediately beneath the liquid crystal panel.

Especially for notebook personal computers requiring reduced thickness and light weight, it is a general approach to employ back-light units of the side edge scheme.

Figure 14:
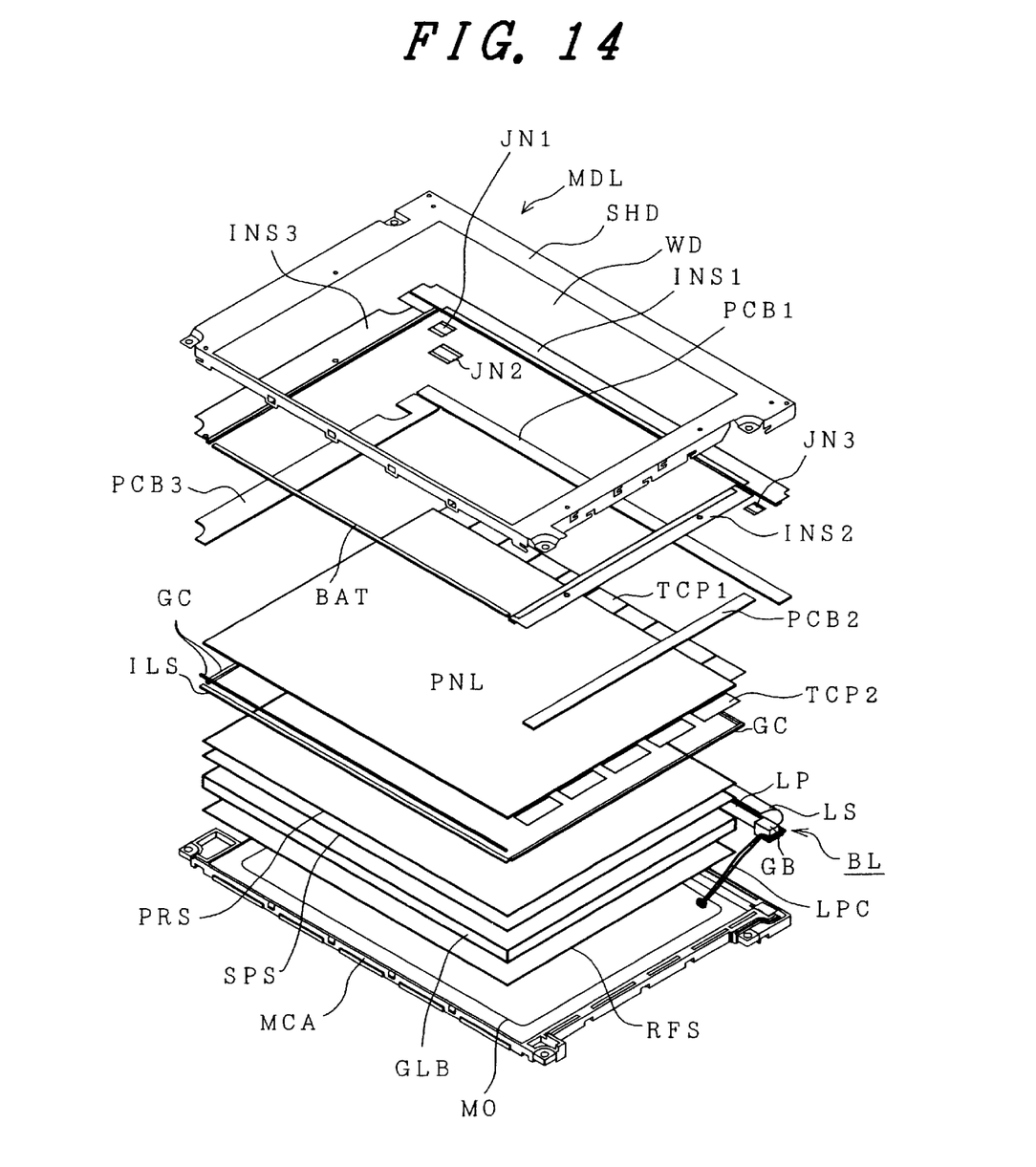
FIG. 14 is an exploded perspective view of one exemplary structure of a liquid crystal display device.

FIG. 14 is a diagram depicting an exploded perspective view of one exemplary structure of a liquid crystal display device. In FIG. 14, "SHD" designates a shield casing (also known as metal frame) made of a metal plate; WD denotes a display window; INS1–3 indicate dielectric sheets; PCB1–3 represent printed circuit boards (PCB1 is a drain-side circuit board for use as an image signal driver circuit board, PCB2 is a gate-side circuit board, and PCB3 is an interface circuit board); JN1–3 are joiners for electrical connection between associated ones of the circuit boards PCB1–3; TCP1, TCP2 are tape carrier packages; PNL, a liquid crystal panel; GC, rubber cushion; ILS, optical shielding spacer; PRS, prism sheet; SPS, optical diffuser sheet; GLB, light guide plate; RFS, reflection sheet; MCA, lower-side casing (mold frame) as formed by all-at-a-time machining; MO, opening of lower-side casing MCA; ;LP, fluorescent tube; LPC, lamp cable; GB, rubber bush for support of the fluorescent tube LP; BAT, both-side adhesive tape; BL, back-light unit consisting essentially of a linear light source (fluorescent tube) LP and light guide plate GLB and the like, wherein diffuser plate members are stacked or laminated over one another to assemble the liquid crystal display module MDL.

Although in the illustrative liquid crystal display device the reflective sheet RFS is disposed on the lower surface (back plane) of the back-light BL with the diffuser sheet SPS and prism sheet PRS being laminated on the upper surface thereof, another diffuser sheet SPS may be further stacked on the prism sheet PRS where appropriate. In addition, while in this arrangement a single unit of linear light source LP is laid out along one side of the light guide plate GLB with wedge-like cross-section, there are also known a large-screen size device which is designed to employ two or more light sources together or alternatively the one that makes use of a flat plate-shaped light guide plate having its two parallel opposite sides along each of which one or a plurality of linear light sources are installed. Additionally the remaining components are explained by adding to the drawing their parts names along with the reference characters thereof The liquid crystal display module MDL is structured from two types of accommodation/support members such as the lower side casing MCA and shield casing SHD and is arranged by integrally engaging the shield case SHD and the lower side case MCA together, wherein the former is made of metal to receive therein the dielectric sheets INS1–3 and circuit boards PCB1–3 plus liquid crystal panel PNL whereas the latter receives therein the back-light BL that consists essentially of the fluorescent tube LP and light guide plate GLB plus prism sheet PRS and others.

The image signal line driving circuit board PCB1 has a built-in integrated circuit (IC) chip for use in driving each pixel of the liquid crystal panel PNL; the interface circuit board PCB3 has components mounted thereon, including an IC chip for receiving an image signal(s) from an external host and also a control signal or signals such as a timing signal or the like along with a timing converter TCON for processing the timing to generate a clock signal.

The clock signal as generated by the timing converter is supplied to the IC chip mounted on the image signal line drive circuit board PCB1 via a clock signal line CLL railed on the interface circuit board PCB3 and image signal line driving circuit board PCB1.

The interface circuit board PCB3 and image signal line driving circuit board PCB1 are multilayer lead pattern substrates, wherein the clock signal line CLL is formed as an internal lead of the interface circuit board PCB3 and image signal line driving circuit board PCB1.

Note that the liquid crystal panel PNL is arranged so that the drainside circuit board PCB1 for driving TFTs and gate-side circuit board PCB2 plus interface circuit board PCB3 are connected by the tape carrier packages TCP1, TCP2 while associative ones of such circuit boards are connected together by the joiners JN1, 2, 3.

Figure 15:
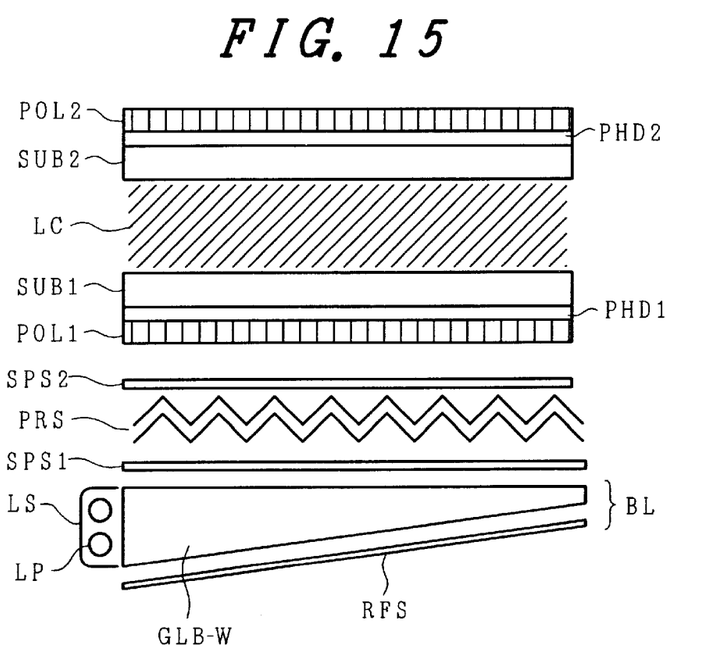
FIG. 15 illustrates in cross-section a multilayer structure of the liquid crystal display device shown in FIG. 14.

FIG. 15 is a diagram pictorially representing a sectional view of a multilayer structure of the liquid crystal display device shown in FIG. 14, wherein the liquid crystal layer LC is sandwiched between the lower substrate SUBI and upper substrate SUB2 to constitute the liquid crystal panel, the lower substrate SUB1 and upper substrate SUB2 having their outer surfaces on which a double-layer structure consisting of a lower phase difference plate PHD1 and lower polarization plate POL1 and a bilayer structure of an upper phase difference plate PHD2 and upper polarization plate POL2 are stacked respectively.

This liquid crystal panel has its back surface (rear plane) on which the back-light BL is placed while letting an optical sheet consisting of a lamination of the diffuser sheet SPS and prism sheet PRS be inserted between the liquid crystal panel and the back-light BL.

The back-light BL used is of the side-edge scheme type, wherein the linear light source (fluorescent tube or light-emitting diode) LS and reflector sheet LP are disposed along one lateral side of a light guide plate GLB-W having a wedge-like cross-section. Although in this back-light BL two fluorescent tubes LP are used to achieve increased brightness, these may be replaced with a single one or three or more ones on a case-by-case basis. Where necessary, a structure may be employed which includes one or two or more fluorescent tubes as disposed along each side of the opposite sides of a flat planar light guide plate. Additionally the back-light BL has its back face on which the reflector film RFS is disposed.

Figure 16:
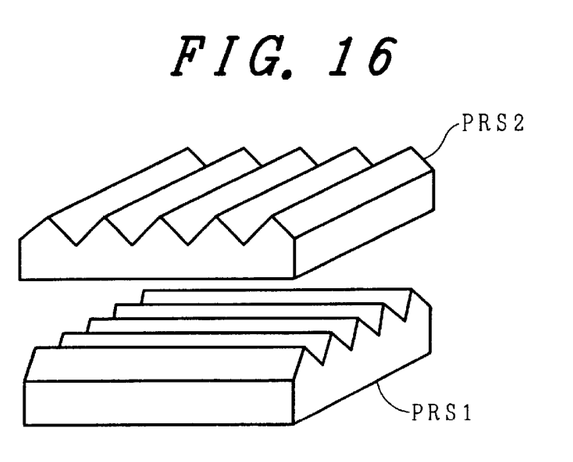
FIG. 16 depicts a perspective view of stacked prism sheets with an exemplary groove layout as used in the device structure of FIG. 15.

FIG. 16 is a pictorial representation for explanation of one example of a groove layout of the prism sheet in FIG. 15, wherein the lower side prism sheet PRS1 elongates in the lateral direction (rightward/leftward direction=horizontal direction: X) for collecting those rays of light coming from the back-light BL together in the lengthwise direction (upward/downward direction=vertical direction: Y) whereas the upper side prism sheet PRS2 extends in the up/down direction to collect together light rays from the back-light BL in the lateral direction thereby letting resultant light fall onto the back surface of the liquid crystal panel PNL at sharp or acute angles thereto.

Figure 17:
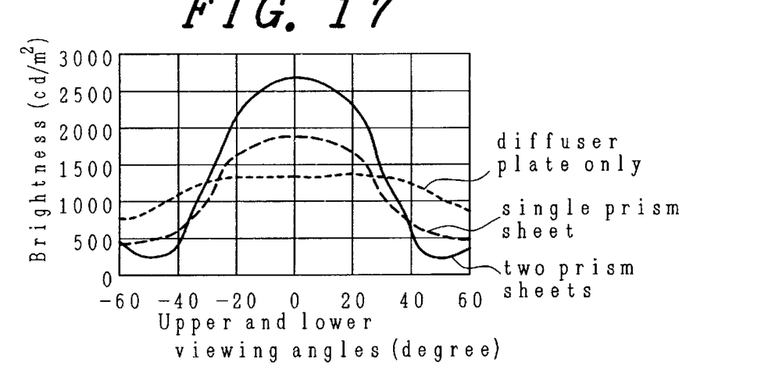
FIG. 17 is a graph showing a relation of a front-side brightness versus the upper/lower viewing angles due to the presence or absence of the prism sheet(s).

FIG. 17 is a diagram for explanation of the significance of a front-face brightness relative to the upper and lower viewing angles of a display screen due to the presence or absence of the prism sheet, which indicates front-face brightness values of respective cases including a case of providing a single prism sheet, a case of providing two ones, and a case of using only diffuser plate (in the absence of any prism sheet).

As shown in the same drawing, provision of a single prism sheet PRS results in an increase in brightness when compared to the case of avoiding the use of such prism sheet PRS (with the diffuser plate only). And, it would readily occur to those skilled in the art that providing two prism sheets PRS results in a further increase in brightness on the front side.

Note here that the back-light of this type has been disclosed in "SID 96 DIGEST" at pp. 753–756.

Liquid crystal display devices are increasing in size every year, which in turn requires that back-light modules associated therewith likewise increase in dimension. In addition to such size increase, a need to achieve higher brightness or luminance is getting more strict, which necessitates the development of advanced back-light units with enhanced light intensity (increased brightness) through improvements in use efficiency of rays of light concerned.

A method has been employed for using the above-noted prism sheet or sheets to increase the brightness or luminance intensity by collection of those rays of incident light diagonally travelling with respect to the liquid crystal panel toward a front face side. Another method is also known which makes use of a recently developed optical film (such as for example "D-BEF" film™ as manufactured by SUMITOMO-3M Company) as designed to let output light of a light source have polarization characteristics for permitting penetration of only specific rays of the polarized light for re-use purposes while causing the remaining rays to be reflected off.

However, the related art approach of employing more than one prism sheet is such that when an operator or user moves to diagonally look at the liquid crystal panel at certain offset angles to the normal to the front surface thereof, there will possibly be observed the phenomenon that the brightness behaves to decrease and thereafter increase again.

Figure 18:
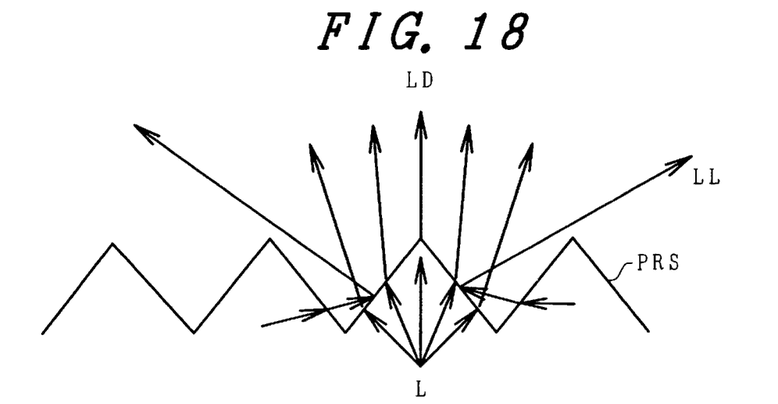
FIG. 18 is a diagram for explanation of the brightness characteristics of a liquid crystal display device employing a prism sheet.

FIG. 18 is a pictorial representation for explanation of the brightness characteristics in a liquid crystal display device using a prism sheet. Light L that has reached the prism sheet PRS is such that when passing through the prism plane, most rays $L_D$ of it is changed in optical travel path toward the direction of the liquid crystal panel thereby improving the liquid crystal panel's front face brightness. However, the remaining light components $L_L$ that have been mirror-reflected at the prism plane or have left the prism sheet to outgo at large angles relative to the liquid crystal panel can result in occurrence of either drop-down or re-increase of the brightness of the liquid crystal panel when viewing diagonally the liquid crystal panel.

Figure 19:
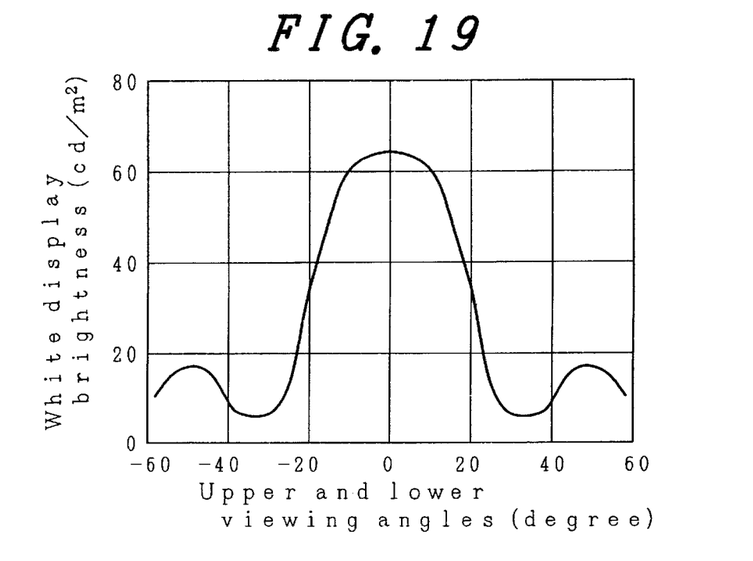
FIG. 19 is a brightness characteristic diagram for explanation of a relation of white display brightness relative to the upper/lower viewing angles of a liquid crystal panel in case more than one prism sheet is used therein.

FIG. 19 is a brightness characteristic diagram for explanation of one example of a relation of white-display brightness versus upper/lower viewing angles of a liquid crystal panel using a prism sheet. As indicated by curve "a" in this drawing, as the upper/lower viewing angles of the liquid crystal panel vary from zero degrees (front view field) to a diagonal direction, the resulting brightness ($cd/m^2$) behaves to gradually decrease to finally reach its minimal value at or near ±30 degrees and then acts to again increase thereafter. This can disadvantageously serve to lower the on-screen image recognizability or viewability over the entire area of such liquid crystal panel.

The above-discussed optical film aimed at improvement of brightness by utilizing polarized light rays is faced with a problem that its brightness enhance ratio is different depending upon different viewing angles, which would result in a decrease in on-screen image viewability in a manner similar to that stated above.

SUMMARY OF THE INVENTION

It is therefore an object of the present invention to avoid the problems faced with the related art thus providing a liquid crystal display device with an improved back-light unit excellent in viewing characteristics while increasing the use efficiency of rays of light emitted therefrom.

To attain the foregoing object the present invention provides a specific liquid crystal display device which is typically structured as will be set forth below.

(1) A liquid crystal display device that comprises at least, a pair of substrates opposing each other, at least one of which has thereon an electrode, a liquid crystal panel consisting essentially of a liquid crystal layer as sandwiched between the pair of substrates, an upper polarization plate and a lower polarization plate as disposed causing the liquid crystal panel to reside therebetween, a control means operatively responsive to receipt of a display image signal for applying a voltage to the electrode, and an illumination light source for illuminating the liquid crystal panel from a back surface thereof, characterized in that the device further comprises:

an optical film member between the liquid crystal panel and the illumination light source for control of refractivity when output light from the illumination light source reaches the liquid crystal panel.

(2) A liquid crystal display device that comprises at least, a pair of substrates opposing each other, at least one of the substrates having thereon an electrode, a liquid crystal panel including a liquid crystal layer sandwiched between the pair of substrates, an upper polarization plate and a lower polarization plate as disposed causing the liquid crystal panel to reside therebetween, a control means operatively responsive to receipt of a display image signal for applying a voltage to the electrode, and an illumination light source for illuminating the liquid crystal panel from a back surface thereof, featured in that the device further comprises:

an angle-dependent control film member provided between the liquid crystal panel and the illumination light source for angularly controlling output light as emitted from the illumination light source to reach the liquid crystal panel; and an optical film member provided between the angle-dependent control film member and the liquid crystal panel for control of refractivity when output light leaving the angle-dependent control film member reaches the liquid crystal panel.

(3) A feature of the present invention is that the optical film member is integral with the lower polarization plate.

(4) Another feature of this invention lies in that the optical film member has a light collection function for increasing the brightness of output light traveling in a direction at right angles to this film while at the same time causing output light at an angle of 45 degrees to the normal to this film to decrease in brightness.

(5) Still another feature of the invention is that the angle-dependent control film member has a light polarization function and that the output light from the illumination light source is caused by this film member to increase in brightness so that certain output light traveling in the vertical direction relative to the surface of such film is different in brightness increase from output light progressing in a direction at an angle of 45 degrees from the vertical direction to the film surface while letting the brightness increase in the vertical direction be high.

(6) Yet another feature of the invention is that the surface of the lower polarization plate opposes or comes into contact with the optical film member on a specified plane, which is in the transformation state.

(7) A further feature of the invention is that an adhesive layer is provided between the optical film member for control of the refractivity of the output light upon falling onto the liquid crystal panel and the lower polarization plate.

(8) A still further feature of the invention is that the refractivity in the front face direction on the film surface of the angle-dependent control film member is small (less than or equal to 2% by way of example) and the refractivity in a diagonal direction of 45 degrees is slightly greater than it (for example, less than 5%).

It should be noted that the angle-dependent control film member is featured in that it is comprised of either a single prism sheet or a multilayer structure of two separate prism sheets with their parallel groove patterns being crossed or intersected for constitution of a prism plane thereof. In the case of employing a single prism sheet, it will be desirable that the groove direction of such prism be the horizontal direction.

With such an arrangement, the use efficiency of rays of output light emitted from the illumination light source may be significantly improved thereby enabling obtainment of the intended liquid crystal display device of high brightness with enhanced viewing characteristics.

The present invention should not be limited only to the above-noted arrangements and more than one embodiment as will be set forth later in the description and may be modifiable and alterable into a wide variety of forms without departing from the spirit and scope of the invention.

DETAILED DESCRIPTION OF THE PREFERRED EMBODIMENTS

Some preferred embodiments of the present invention will be explained with reference to the accompanying drawings below.

Figure 1A:
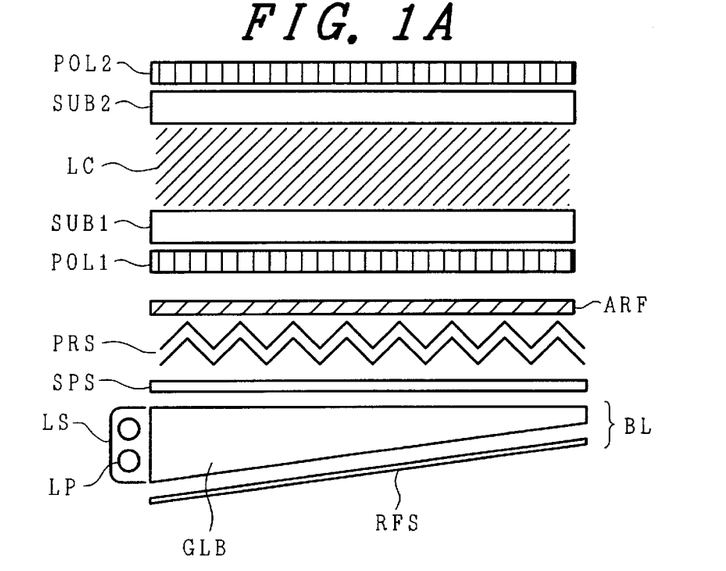
FIG. 1 is a pictorial representation diagram for explanation of a configuration of a first embodiment of the liquid crystal display device in accordance with the present invention.
Figure 1B:
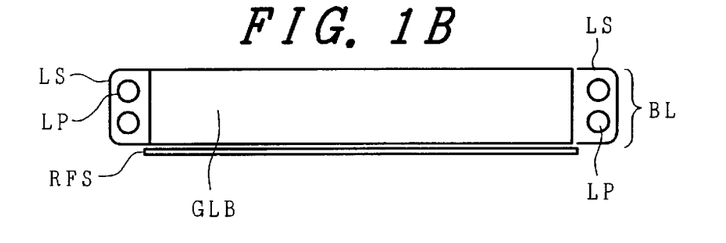

FIG. 1 is a pictorial representation of an arrangement of a liquid crystal display device in accordance with a first embodiment of the invention, wherein FIG. 1A illustrates an overall structure whereas FIG. 1B depicts another structure in FIG. 1A. SUB1 designates a lower substrate, and SUB2 is an upper substrate, which substrates constitute a liquid crystal panel with a liquid crystal layer LC sandwiched between them.

The liquid crystal panel has its lower and upper surfaces on which a lower polarization plate POL1 and upper polarization plate POL2 are laminated respectively. Optionally a phase difference is installed between the lower substrate SUB1 and lower polarization plate POL1 and/or between the upper substrate SUB2 and upper polarization plate POL2 when the need arises.

Disposed on the back plane (lower surface) of the liquid crystal panel is a back-light unit BL with an optical sheet laid therebetween, which sheet is structured from a two-layer prism sheet PRS and an optical diffusion sheet SPS, the former having prism grooves crossed or intersected (for example, at right angles to each other).

In the exemplary structure shown in FIG. 1A, the back-light BL is arranged to include a light guide plate GLB with wedge-like cross-section and a fluorescent tube LP functioning as a linear light source plus a reflector sheet LS associated therewith. Alternatively, this back-light BL may be arranged so that one or a plurality of fluorescent tubes LP are laid out on each side of the opposite ends of a flat plate-shaped light guide GBL as shown in FIG. 1B.

Especially, The board has strong directivity and a condensing effect. Therefore, the board has a reduction of brightness with a specific visual angle that is similar to a prism sheet.

And, an anti-reflection film (total reflection film) ARF is arranged between the lower polarization plate POL1 and the prism sheet PRS. This anti-reflection film (total reflection film)ARF is provided for suppressing both drop-down and re-rise-up of the brightness or luminance when diagonally looking at the liquid crystal panel to thereby improve the visual image recognizability or viewability over the entire surface area of the liquid crystal panel.

Figure 2:
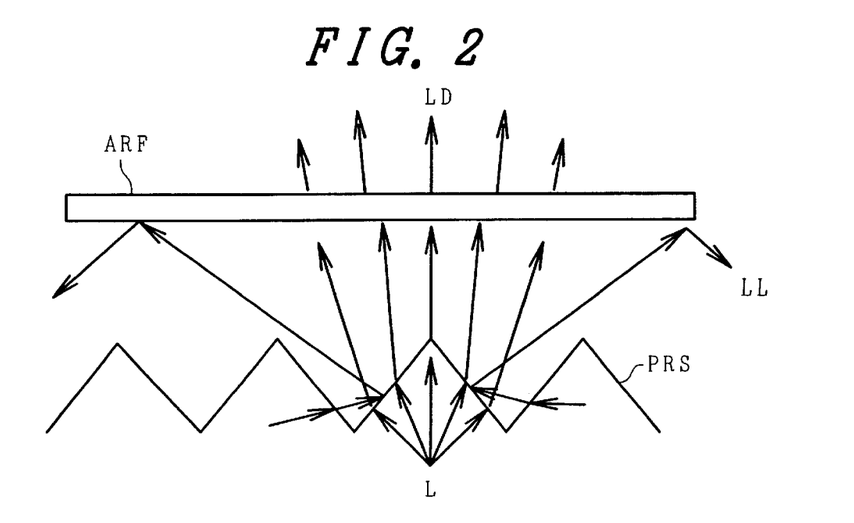
FIG. 2 is a pictorial representation for explanation of the function of an anti-reflection film (total reflection film) in FIG. 1.

Referring to FIG. 2, there is depicted an enlarged sectional view of certain part of the liquid crystal panel, for explanation of a function of the anti-reflection film or total reflection film. The anti-reflection film has the function that reflects the light that injects at angle more than a critical angle.

The anti-reflection film (total reflection film) ARF is positioned in an upward spaced relation to the prism sheet PRS. In the case of employing two separate prism sheets PRS, the illustrative one represents the upper-side (liquid crystal panel side) prism sheet.

Most components $L_D$ of incident light from the lower side (back plane) of the prism sheet PRS—namely output light L leaving the optical diffuser sheet SPS of FIG. 1—behave to pass through the grooves of the prism sheet PRS to be collected together in a vertical direction at right angles to the surface of the liquid crystal panel.

However, part of the light L and part of light that has been reflected inside the prism sheet PRS become rays of light $L_L$ that outgoes from the prism sheet PRS at large angles. Those rays of this light $L_L$ which travel at an angle of 45 degrees or greater from the vertical direction of the plane of the anti-reflection film (total reflection film) ARF are totally reflected off by this anti-reflection film (total reflection film) ARF to return to the side of the prism sheet PRS for reuse purposes.

Accordingly, it becomes possible to suppress any unwanted brightness increases in certain viewing angles in directions diagonal to the liquid crystal panel while at the same time letting those light rays returning to the prism sheet PRS side increase in brightness at view angles in the front face directions.

Figure 3:
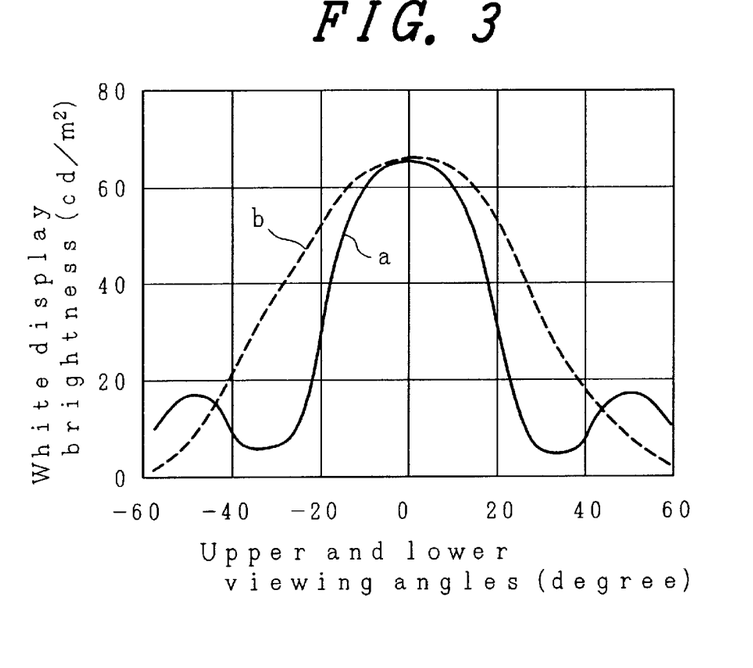
FIG. 3 is a brightness characteristic diagram for explanation of a relation of white display brightness versus the upper and lower viewing angles of a liquid crystal panel in the embodiment of this invention, as compared to the related art.

See FIG. 3, which is a brightness characteristic diagram for explanation of a relation of white-display brightness versus the upper/lower viewing angles of the liquid crystal panel in the illustrative embodiment, as compared to the related art. Curve "a" in the drawing designates the brightness characteristic of the related art as has shown in FIG. 19 whereas curve "b" indicates the brightness characteristic of this embodiment.

With the related art, as shown by curve "a" as the view angle of the liquid crystal panel changes from zero degrees (front view field) to diagonal or oblique directions, the resulting brightness (cd/m$^2$) attempts to gradually decrease to become a minimal value at or near ±30 degrees and then behaves to increase again (as has been discussed previously in conjunction with FIG. 19). This can result in degradation of the viewability on the entire surface area of the liquid crystal panel. By contrast, in case the antireflection film (total reflection film) ARF is disposed overlying the prism sheet PRS, curve "b" well demonstrates that such brightness re-improvement at or near a point of 50° may be suppressed while simultaneously allowing the light $L_L$ as totally reflected off from the anti-reflection film (total reflection film) ARF to again return to the prism sheet PRS for reuse purposes. Due to this, the resultant brightness in view-field regions in diagonal directions may increase as indicated by arrow in FIG. 3 thereby lowering drop-out of the brightness at view angles in such diagonal directions while also improving the front face brightness, which results in achievement of generally smoothed brightness curve as a whole. In other words the liquid crystal panel's view-angle dependency is improved.

Figure 4:
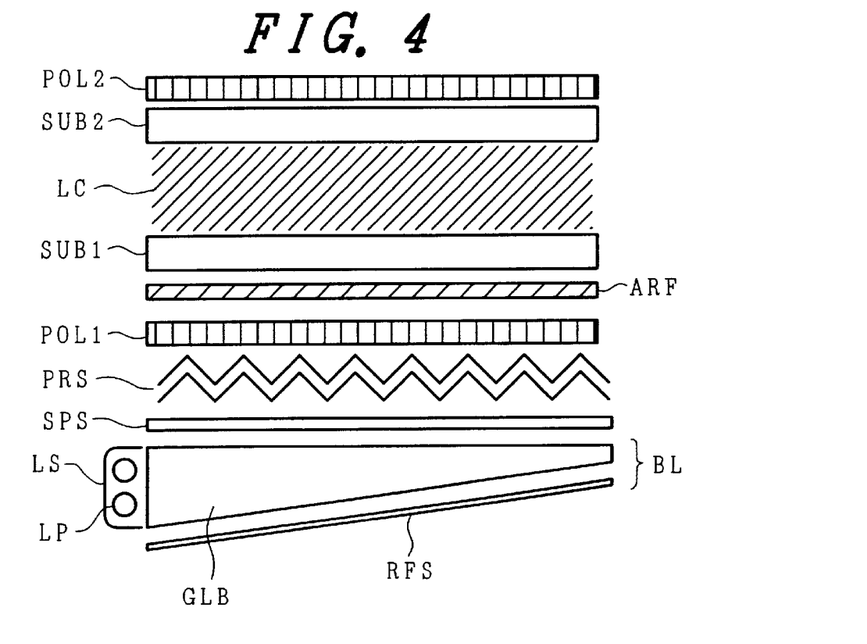
FIG. 4 is a pictorial representation for explanation of an overall arrangement of a second embodiment of the liquid crystal display device in accordance with the present invention.

Turning now to FIG. 4, there is illustrated in cross-section a liquid crystal display device in accordance with a second embodiment of the invention. This embodiment is similar in structure to that shown in FIG. 1 with the anti-reflection film (total reflection film) ARF being disposed between the lower polarization plate POL1 and the liquid crystal panel.

With this embodiment also, certain rays of light as emitted from the illurnination light source to pass through the prism sheet PRS (the light traveling at angles of more than 45 degrees from the vertical direction to the surface of the anti-reflection film ARF) other than those light rays that have been collected by the prism sheet PRS are caused by the anti-reflection film (total reflection film) ARF to return to the side of the prism sheet PRS for reuse purposes, resulting in obtainment of a smooth brightness curve as a whole as previously explained in conjunction with FIG. 3. In other words the liquid crystal panel's view-angle dependency is improved.

Figure 5:
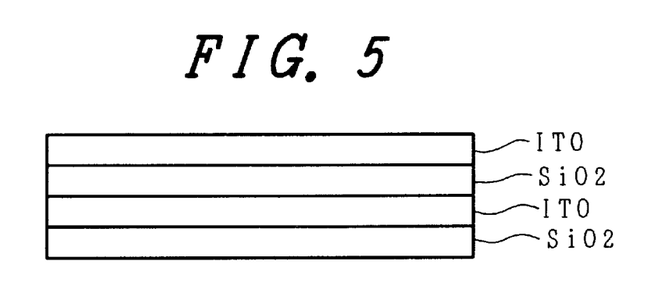
FIG. 5 is a diagram schematically depicting in cross-section one exemplary structure of the anti-reflection film (total reflection film) used in the invention.

See FIG. 5. This diagram depicts in cross-section one exemplary anti-reflection film (total reflection film) used in the present invention. This anti-reflection film (total reflection film) shown herein is designed to have a multilayer structure of at least two layers such as an alternate lamination of ITO and $SiO_2$, which offers the functionality of letting incident light rays reflect for return.

In case the refractive index of the first layer is made N1 and the refractive index of the second layer is made N2, critical angle θ is represented in SIN θ=N2/N1. As a difference with refractive indexes N1 and N2 is large, a critical angle becomes small.

It is desirable that to increase total reflection effects more, the difference of the refractive index of every film that is laminated is made 0.1 or more. By increasing the number of layers that is laminated even in case the difference of a refractive index is small, a total reflection effect of a wish can be obtained.

In FIG. 5, ITO and $SiO_2$ are laminated alternately. The refractive index of ITO is 1.9, and the refractive index of $SiO_2$ is 1.5. The base film that a lamination film is formed uses PET(polyethylene terephtalate).PET is the same refractive index as $SiO_2$, and total reflection effects are not given a bad influence.

It is possible to select the material that has a refractive index that is larger than a layer with a large refractive index or the material that has a refractive index that is smaller than a layer with a small refractive index as a base film.

Figure 6:
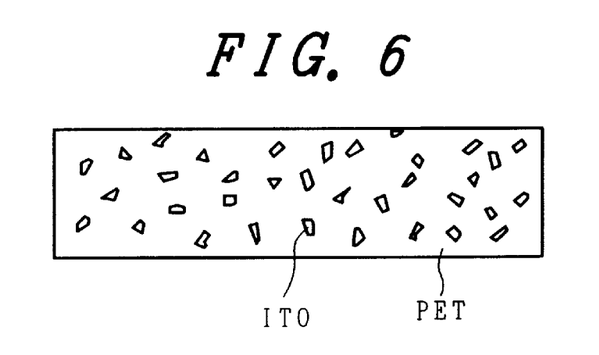
FIG. 6 is a diagram schematically showing in cross-section another exemplary structure of the anti-reflection film (total reflection film) used in the invention.

See FIG. 6, which shows in cross-section another exemplary structure of the anti-reflection film (total reflection film) used in the present invention. This anti-reflection film (total reflection film) shown is designed for example to employ a PET(polyethylene terephtalate) film with ITO micro-particles or impalpable powder mixed therein and thus offer functionality of letting incident light reflect for return.

Because ITO is conductive, an electromagnetic wave interruption effect is obtained by connecting an anti-reflection film (total reflection film) and a shield case SHD of liquid crystal display. It is possible to cut off electromagnetic wave by applying a voltage to ITO.

The anti-reflection film (total reflection film) used in the invention should not be limited only to the above examples which are directed to single use of such film as an independent component alone and may alternatively be modified so that anti-reflection processing is applied to the upper or lower surface of the lower polarization plate POL1 or to the outer surface of the lower substrate SUB1 of the liquid crystal panel.

Figure 7:
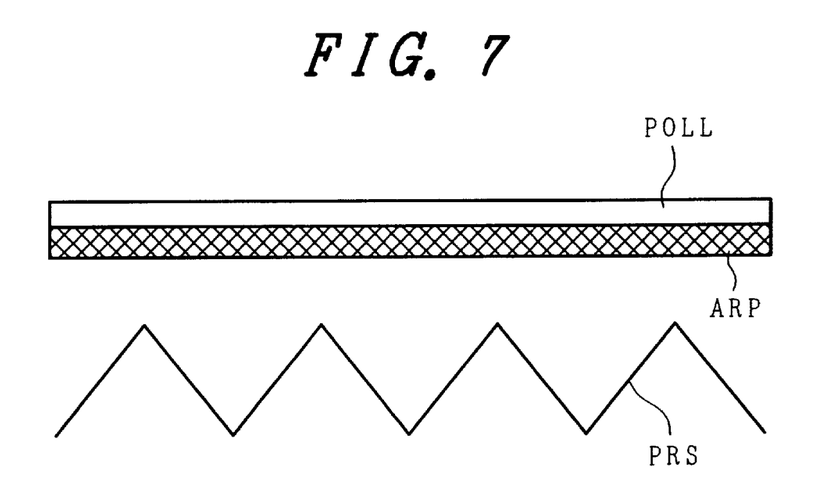
FIG. 7 is a pictorial representation for explanation of an embodiment that employs a lower polarization plate having its lower surface with antireflection treatment applied thereto.

See FIG. 7, which shows an embodiment employing a lower polarization plate having its lower surface with anti-reflection processing applied thereto. This antireflection processing is obtainable by fabricating or depositing on the surface of such lower polarization plate POL1 a thin-film which is similar in structure to that shown in FIG. 5 or 6. By laminating ITO and $SiO_2$ to a lower polarization plate POL1, anti-reflection film is formed to a lower polarization plate POL1. The process that ITO is applied or is evaporated to a lower polarization plate POL1 and the process that $SiO_2$ is applied or is evaporated to a lower polarization plate POLL are repeated, and an anti-reflection film is formed to a lower polarization plate POL1.

Further, the anti-reflection film (total reflection film) in this invention may be such that a similar film to that shown in FIG. 5 or 6 is adhered to the upper surface or lower surface of the lower polarization plate POL1 or alternatively to the surface of the lower substrate of the liquid crystal panel.

In this case the upper or lower surface of the lower polarization plate POL1 or the surface of such lower substrate of the liquid crystal panel should be required to be made smooth and flat in order to suppress reflectivity and/or optical scattering on such adhesion plane. By laminating ITO snd $SiO_2$ to lower substrate of the liquid crystal panel, anti-reflection film(total reflection film) is formed to lower substrate of the liquid crystal panel. The process that ITO is applied or is evaporated to lower substrate of the liquid crystal panel and the process that $SiO_2$ is applied or is evaporated to lower substrate of the liquid crystal panel are repeated, and an anti-reflection film(total reflection film) is formed to lower substrate of the liquid crystal panel.

It will be desirable that the anti-reflection film (total reflection film) stay within a prespecified limited range of incident light angles: According to the analysis through experimentation using samples, good results have been obtained over the entire view-angle region when the reflectivity within 5° from the vertical plane of this film was set at 2% or less while the reflectivity in a diagonal direction at an angle of 45 degrees thereto was equal to or less than 5%.

It should be noted that the anti-reflection film (total reflection film) is modifiable so that it is made of other similar suitable films including, but not limited to, optical films of the polarization reflection reuse type such as for example a P-S polarization separation film.

While in standard liquid crystal display devices a change in application voltage would result either in a change from white to black display or in a change from black to white display, the liquid crystal layer applied to this invention is capable of application to any one of a wide variety of types of liquid crystal display devices including but not limited to an LCD device of the twisted-nematic (TN) type with its angle of twist set at 90 degrees or more or less employing vertical alignment type TFT drive schemes or alternatively of the super twisted-nematic (STN) type with its twist angle ranging from 200 to 260 degrees using time-division drive schemes, and further those flat-panel displays of what is called the "lateral electric field" scheme operatively responsive to an electric field as created in a direction parallel to substrate surfaces.

In the case of such liquid crystal display devices of the TN type and those of the lateral electric-field scheme, it is preferable in order to attain both the contact ratio and the brightness at a time that a product Δnd of the liquid crystal layer LC's reflectivity anisotropy Δn and its cell gap (thickness of liquid crystal layer) d is determined to fall within a range of from 0.2 to 0.6 μm; in the case of the STN type, it is preferably designed to fall within a range of 0.5 to 1.2 μm; in the case of the lateral electric field type, it preferably ranges from 0.2 to 0.5 μm.

The lower and upper substrates SUB1, SUB2 may be two glass substrates each of which was manufactured by a method including the steps of polishing for planarization the surface of a glass plate of 0.7 mm thickness and then fabricating thereon a transparent electrode of indium-tin-oxide (ITO) by using sputtering techniques. Let a chosen nematic liquid crystal composition material be sandwiched between these substrates, which material is positive in dielectric constant anisotropy Δnε and has a value of 4.5 with its double refraction Δn set at 0.19 (589 nm at 20° C.) whereas the cell gap was designed to measure 6 μm; thus, the Δnd was determined to be 1.41 μm.

After having deposited by spinner techniques a polyimide-based alignment control film as has been coated on the substrate surface, the resultant structure is subjected to thermal processing at 25° C. for 30 minutes and then to rubbing treatment thus obtaining a pre-tilt angle of 3.5 degrees (measured by rotation crystal methods).

The rubbing direction on the both substrates was determined so that the angle of torsion (twist angle) of liquid crystal molecules measures 240 degrees in view of the fact that time-divisional drive is to be performed. Here, the twist angle is definable by the rubbing direction and by the kind and amount of an optically rotary polarizable material to be added to the nematic liquid crystals used. The twist angle must be limited in its maximal value due to the fact that the turn-on state near the threshold value thereof provides specific orientation or alignment permitting light to scatter or disperse—typically, the upper limit is at 260 degrees; on the contrary, the lower limit value must be 200 degrees due to limitations by the contrast.

As the above embodiment is also aimed at provision of a liquid crystal panel capable of offering white/black display-abilities with satisfiable contrast even when the number of scanning lines is 200 or greater, the twist angle was set at 240 degrees. Optionally, a phase difference film may be laid out between each substrate and its associative optical polarization plate, which film is made of polycarbonate with Δnd=0.4 μm.

The optical diffuser sheet SPS has a function of scattering any interference fringes of a light reflection pattern of prism sheets or light guide plates. Note here that where necessary, a similar optical diffuser sheet SPS may be disposed either between the lower polarization plate and the antireflection film (total reflection film) or on the lower surface of the liquid crystal panel.

With such an arrangement in the embodiment above, it becomes possible to provide a liquid crystal display device that is bright and less in brightness variation due to a viewing angle while offering enhanced brightness over almost the entire surface area of the liquid crystal panel.

A detailed explanation will next be given of an exemplary overall arrangement of a liquid crystal display device of the lateral electric field or in-phase switching (IPS) scheme incorporating the principles of the present invention. It will readily occur to any experts in the art that the principal teachings of the invention may also be applicable to other types of liquid crystal display devices such as those of the TN type or of the simple-matrix type.

With the liquid crystal display device of the lateral electric field type, one of opposite substrates (typically lower substrate) has its surface on which a variety of kinds of electrodes and switching elements for picture element or "pixel" selection are formed whereas the other substrate (upper substrate) has a surface on which a color filter alone is formed, thereby forming an electric field in a specified direction substantially parallel to the substrate plane in a liquid crystal layer as sandwiched between these substrates for control of turn-on/off by letting liquid crystal molecules forming the liquid crystal layer change in alignment direction within the substrate plane.

Figure 8:
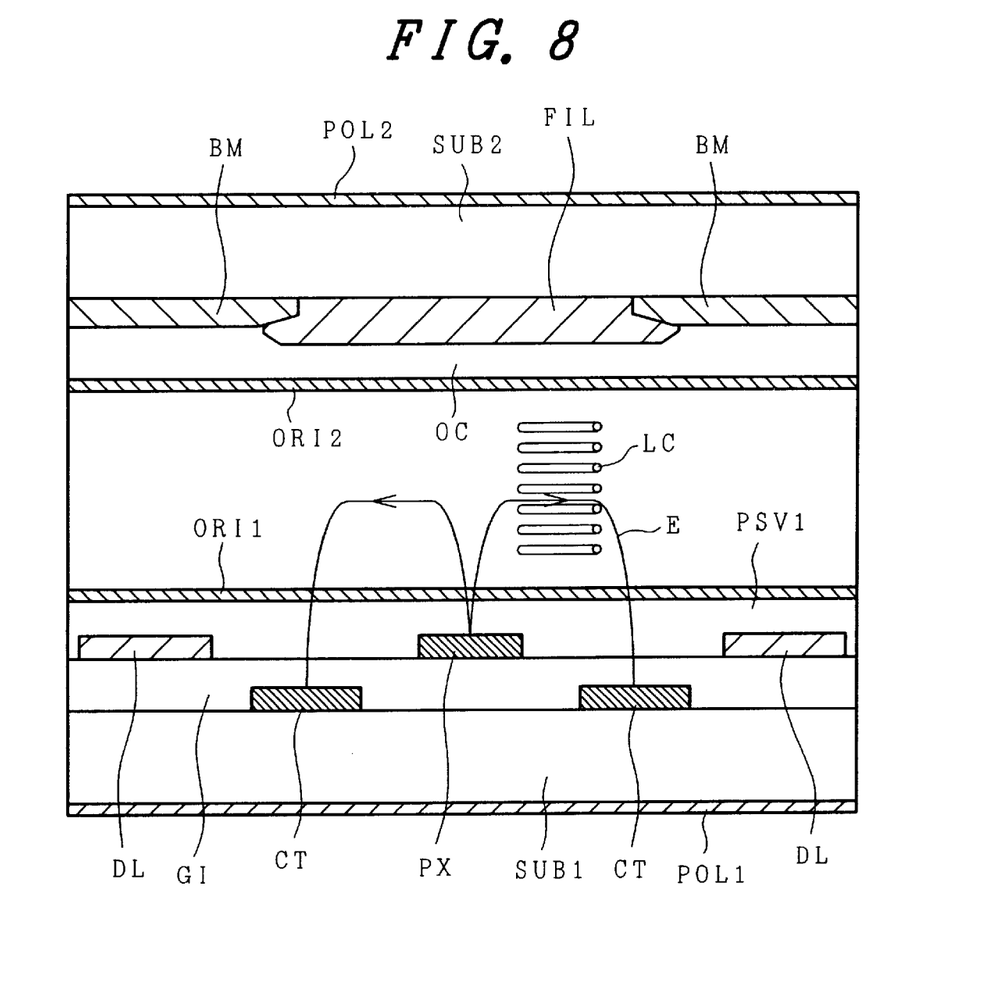
FIG. 8 is a sectional view of one picture element of a liquid crystal display device of the lateral electric-field scheme.

Turning to FIG. 8, there is shown a sectional view of one pixel of the lateral electric-field type liquid crystal display device, wherein CT designates a common electrode; GI denotes a gate insulation film; DL indicates an image signal electrode; PX represents a pixel electrode; ORI1 is a lower alignment film; ORI2, an upper alignment film; LC, a liquid crystal layer (depicted here in the form of liquid crystal molecules); SUB1, lower substrate; SUB2, upper substrate; POL1, lower polarization plate; POL2, upper polarization plate; E, electric field; BM, black matrix; FIL, color filter; OC, overcoat film; PSV1, insulation layer.

Formed on the lower substrate SUB1 is a silicon nitride (SiN) film GI that is a insulation layer, on which thin-film transistors TFT (as will be described later) and image signal electrodes (pixel electrodes) PX that are the electrodes for use in driving the liquid crystals plus common electrodes CT are formed with the insulation layer PSV1 formed overlying these electrodes. And, the color filters FIL of multiple colors as partitioned by the black matrix BM are formed on the upper substrate SUB2 while letting the liquid crystal layer LC be sandwiched between the lower alignment film ORI1 and upper alignment film ORI2 that are formed on the opposing surfaces of the both substrates SUB1, SUB2. Note that the lower polarization plate POL1 and upper polarization plate POL2 are laminated on the outer surface of the lower substrate SUB1 and that of the upper substrate SUB2 respectively. Additionally, the image signal electrodes and common electrodes CT that are in direct contact with the alignment films and liquid crystal layer are made of indium-tin-oxide (ITO) in view of possible metal corrosion risks.

Figure 9:
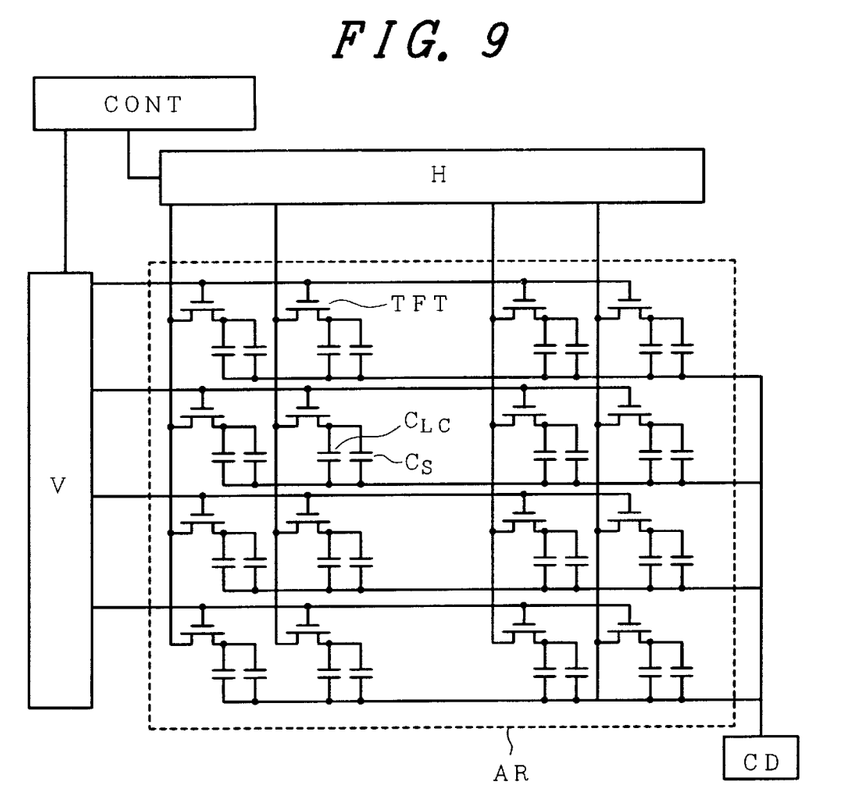
FIG. 9 is a diagram schematically showing a configuration of driver circuitry of the liquid crystal display device shown in FIG. 7.

FIG. 9 is a conceptual diagram of a driver circuit of the liquid crystal display device shown in FIG. 8, wherein CONT denotes a control circuit; V indicates a scan electrode driver circuit; H is a signal electrode driver circuit; CD, common electrode driver circuit; AR, display area of the liquid crystal panel. Additionally, $C_{LC}$ designates a capacitive component of the liquid crystal whereas $C_s$ indicates a capacitor for storage of charge carriers.

A TFT for switching each of the pixels which constitute the display area AR of the liquid crystal panel is driven by the scan electrode driver circuit V and signal electrode driver circuit H plus common electrode driver circuit CD to turn on and off selectively. This turn-on/off operation is under control of the control circuit CONT.

The liquid crystal layer that varies in alignment direction of molecules in response to the TFT's turn-on/off operation is such that the initial alignment direction is established depending upon the alignment states (orientation control abilities) of the lower and upper alignment films ORI1, ORI2 as fabricated on the both substrates SUB1, SUB2.

In the illustrative arrangement, polyimide is used as the alignment films, wherein polarized light UV was radiated onto the surface of such polyimide film in order to add the intended alignment controllability to the surface thereof. A KrF excimer laser (wavelength of 248 nm) was employed as the light source of this polarized light UV for irradiation of illumination energy of 5 mJ/cm$^2$ at 76 shots. The lower substrate SUB1 being subject to fabrication of the alignment film thereon is transported at a constant speed, the feed rate of which has been determined to ensure that its irradiation surface is uniformly irradiated with polarized light UV for 76 shots.

In addition, polyimide is coated on the uppermost surface of the upper substrate SUB2 that acts as a color filter substrate, which is then irradiated with polarized light UV in a manner similar to that stated above. Note that the liquid crystal layer LC behaves to align in a specified direction at right angles to the polarized light.

Figure 10:
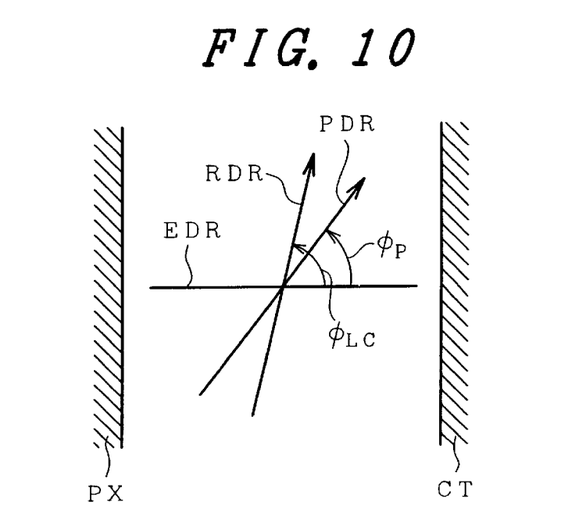
FIG. 10 is a diagram used to explain the definitions of an orientation control direction of an alignment film and a polarization plate transmission axis direction.

FIG. 10 is a diagram for explanation of definitions of the alignment film's alignment control direction and the polarization plate transmission axis direction, wherein EDR is the electric field direction, RDR is the alignment control direction of alignment film, and PDR is the polarization plate transmission axis direction.

Appropriate arrangement was done to let the alignment molecule easy axes of liquid crystals on or over an interface with the upper and lower alignment films become almost parallel to each other while causing each axis to be at angle of 75 degrees ($\phi_{LC1}=\phi_{LC2}=75°$) with respect to the direction of an electric field applied thereto.

A nematic liquid crystal material is injected into an inside space between these both substrates, which is positive in dielectric constant anisotropy $\Delta\epsilon$ and measures 7.3 in value thereof and which is 0.074 (wavelength of 589 nm at 20° C.) in refractivity anisotropy $\Delta n$, thereby completing the liquid crystal layer.

A distance between such two substrates—i.e., cell gap d—is set by uniform distribution of spherical polymer beads between the substrates so that the gap measures 4.0 $\mu$m in a sealed state of liquid crystals. Hence, $\Delta n \cdot d$ is 0.296 $\mu$m.

Let the liquid crystal panel be received between two polarization plate s (for example, G1220DU manufactured by NITTO DENKO-SHA) in such a manner that the polarized light transmission axis of one polarization plate was set at $\phi_{p1}=75°$ whereas that of the other is at right angles thereto—i.e., $\phi_{p2}=-15°$. In this embodiment the so-called normally-close characteristic was employed wherein the dark state is established at a low voltage ($V_{OFF}$) and bright state is at a high voltage ($V_{ON}$).

FIG. 11 is a pictorial representation for explanation of an operation of liquid crystal molecules in the bright state and dark state in the liquid crystal display device of the lateral electric field type, wherein the same reference characters as those in FIG. 8 are employed.

Figure 11A:
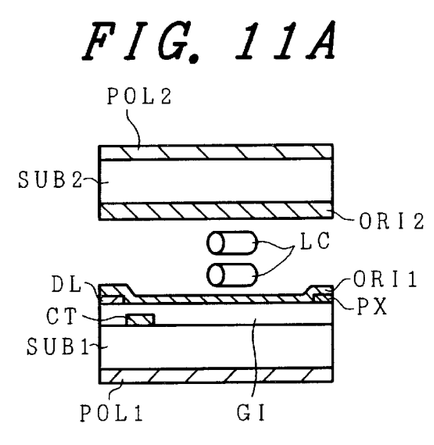
FIG. 11 is a diagram showing some pictorial representations for explanation of operations of liquid crystal molecules in the bright state and dark state of the lateral electric-field type liquid crystal display device.
Figure 11B:
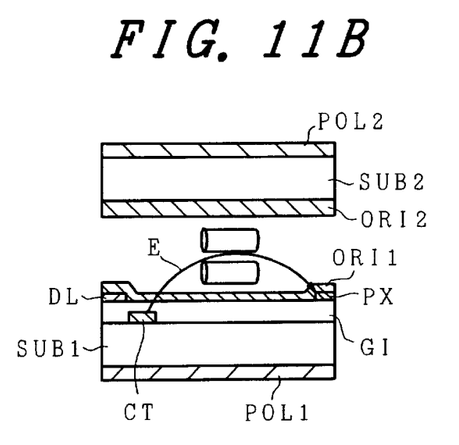
Figure 11C:
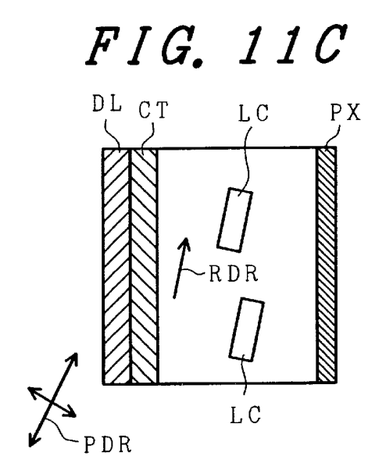

FIG. 11A of the same drawing is a sectional diagram of the device as set in the dark state upon application of a low voltage ($V_{OFF}$); FIG. 11B is a sectional diagram of a dark state in the bright state at voltage application ($V_{ON}$); FIG. 11C is a sectional diagram of a dark state in the dark state at voltage application ($V_{OFF}$); and, FIG. 11D shows a plan view of the bright state at voltage application ($V_{ON}$).

In the dark states shown in FIG. 11A and FIG. 11C, no electric fields are present between the common electrode CT and pixel electrode PX; accordingly, those liquid crystal molecules LC making up the liquid crystal layer are in the initial alignment state causing illumination light from the back-light (not shown) laid out on the lower surface of the lower substrate SUB1 to hardly reach the upper substrate SUB2.

Figure 11D:
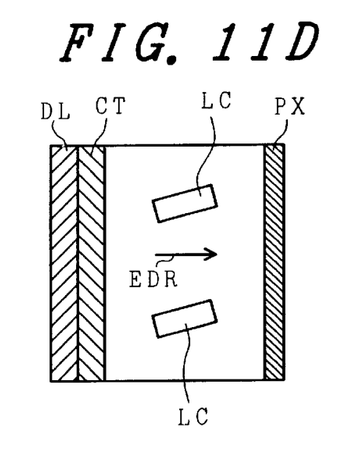

On the other hand, in the bright states shown in FIG. 11B and FIG. 11D, an electric field E exists between the common electrode CT and pixel electrode PX; thus, the liquid crystal molecules LC are driven by this electric field E to rotate in alignment direction allowing the illumination light from the backlight (not shown) disposed on the lower surface of the lower substrate SUB1 to reach the upper substrate SUB2.

In this way, with the liquid crystal display device of the lateral electric field type, letting the liquid crystal molecules LC rotate within a plane in parallel to the flat substrate surface, i.e., in the lateral direction, to change in state between the dark state and bright state results in formation of an image to be visually displayed on the screen.

Figures 12A, 12C:
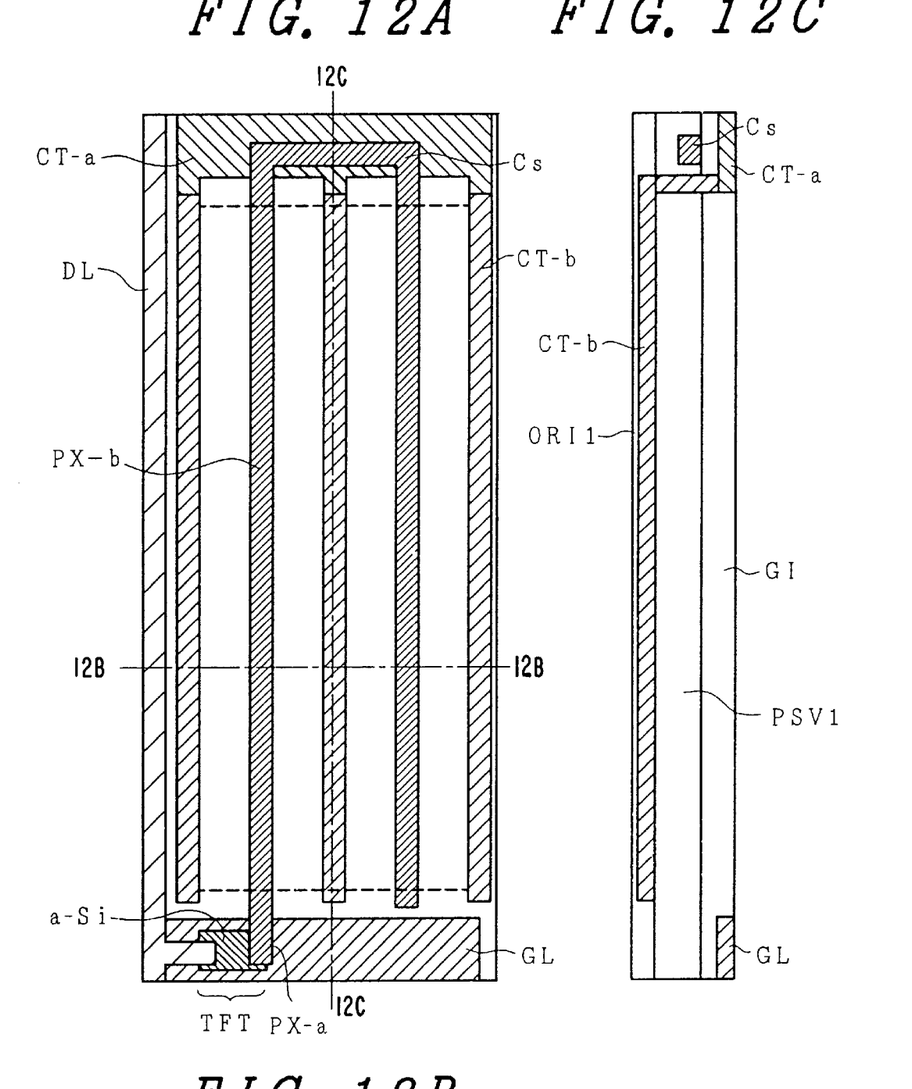
FIG. 12 is an explanation diagram of an electrode structure example in the lateral electric-field type liquid crystal display device.
Figure 12B:
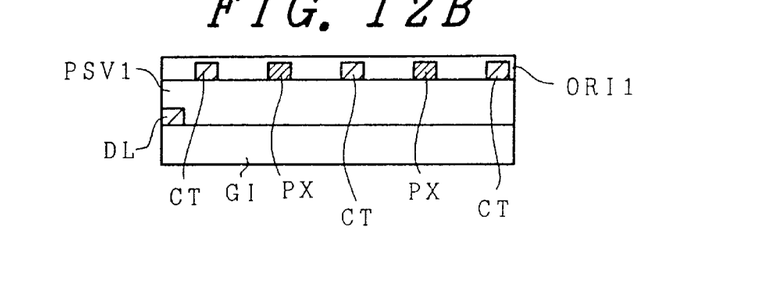

FIG. 12 is a diagram for explanation of an exemplary electrode structure in the lateral electric-field type liquid crystal display device, wherein FIG. 12A is a plan view as looked at from a direction perpendicular to the substrate, FIG. 12B is a cross-sectional view taken along line 12B—12B of FIG. 12A, and FIG. 12C is a sectional view along line 12C—12C of FIG. 12A.

A thin-film transistor TFT is structured from a pixel electrode (source electrode) PX, image signal electrode (drain electrode) DL, scan electrode (gate electrode) GL, and amorphous silicon a-Si. The scan electrode GL and a portion CT-a of the common electrode are arranged by patterning the same metal layer whereas the image signal electrode DL and part PX-a of the pixel electrode are arranged by patterning the same metal layer. Further, after fabrication of a insulation layer GI, part CT-b of the common electrode which is a portion for use in driving liquid crystals is connected via a through-hole to the aforesaid part CT-a of the common electrode while letting the pixel electrode also be in contact with it via a through-hole at a transistor section to thereby constitute part PX-b of the pixel electrode. These common electrode portion CT-b and pixel electrode portion PX-b were formed by use of ITO.

A capacitive element Cs forming the requisite accumulation capacitor was fabricated to have a structure for causing the pixel electrode PX and common electrode CT to sandwich a dielectric protective film (gate insulation film) GI therebetween in a region used to couple between two common electrodes CT. As shown in the plan view diagram (a), the pixel electrode is disposed among three common electrodes CT. The pixel pitch is such that it measures 100 $\mu$m in the lateral direction (namely, between adjacent image signal lead electrodes) and is 300 $\mu$m in the longitudinal direction (i.e., between scan lead electrodes). The electrode width is designed so that certain electrodes linking between a plurality of pixels, such as the scan electrode and signal electrode plus common electrode lead portion (certain portion extending in parallel (lateral direction in FIG. 12 to be later discussed) to the scan lead electrode), are widened to thereby avoid occurrence of line defects. The widths thereof are 10 $\mu$m, 8 $\mu$m and 8 $\mu$m, respectively.

On the other hand, the pixel electrode independently formed on a per-pixel basis and a portion extending along the length of the signal lead electrode of the common electrode are slightly narrowed in width so that they measure 5 $\mu$m and 6 m respectively. Although narrowing or "thinning" these electrodes can result in an increase in risk of open-circuiting due to mixture of contaminant particles or micro-dusts or the like, such risk in this case may be minimized to the extent that a single pixel merely experiences partial defect even in the worst case—it will hardly lead to more serious line defects. The signal electrode DL and common electrode CT were provided with a insulation layer PSV1 laid therebetween at an interval of 2 $\mu$m. The pixel number was set at 640×3×480 resulting from use of 640×3 (R, G, B) signal lead electrodes and 480 lead electrodes.

Figures 13A, 13C:
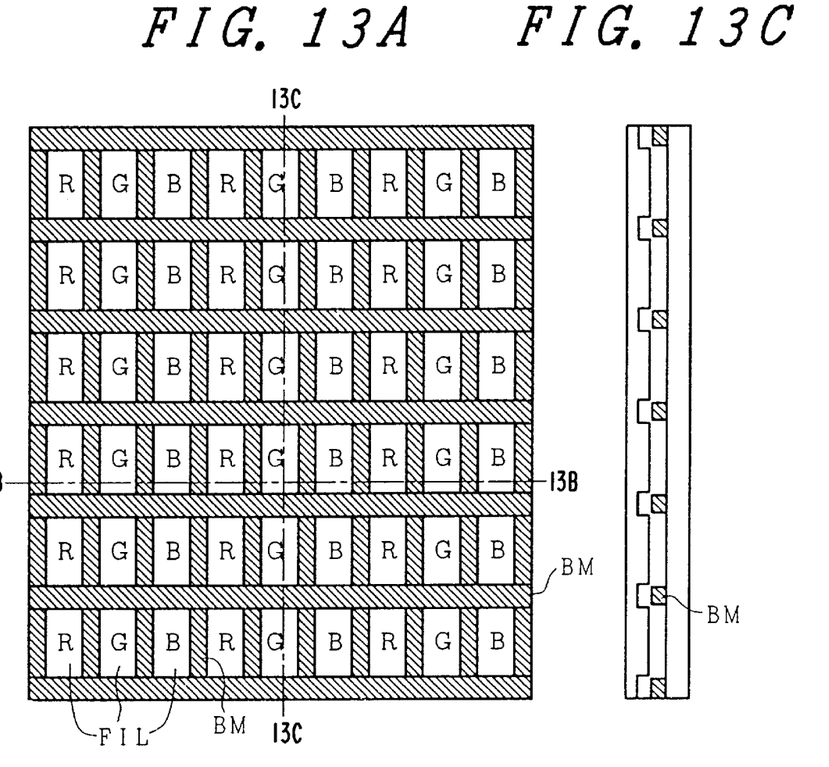
FIG. 13 is a structure explanation diagram of a color filter substrate with a black matrix associated therewith.
Figure 13B:
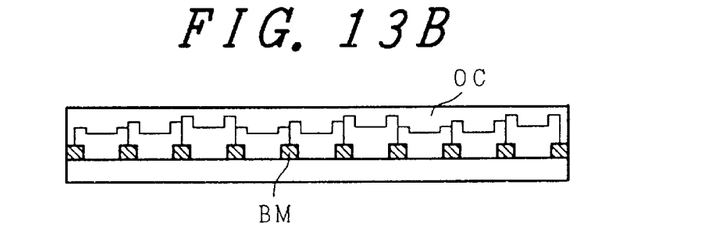

FIG. 13 is a diagram for explanation of a configuration of a color filter substrate with a black matrix added thereto, wherein FIG. 13A is a plan view as viewed from the vertical direction to the substrate surface, FIG. 13B is a sectional view taken along line 13B—13B of FIG. 13A, and FIG. 13C is a sectional view along line 13C—13C of FIG. 13A.

The black matrix BM was made of a chosen material with carbon and organic pigment mixed thereinto. A layout of the black matrix BM with respect to the electrode substrate is shown by broken lines in FIG. 12.

After having formed the black matrix BM, disperse respective pigment components of R, G and B in photosensitive resin to fabricate respective color filters FIL through coating and patterning/exposure plus development processes. And, an epoxy-based high molecular or polymer thin-film was formed by deposition as an overcoat film OC on the color filters FIL.

The resultant liquid crystal display device is capable of obtaining an image display with excellent in uniformity of visualization at wide viewing angles free from any possible shading/gradation inversion while simultaneously retaining good contrast of 10 or greater at angles of 80 degrees or more in every direction.

It is noted that the present invention should not be limited only to the lateral electric-field type liquid crystal display device and may alternatively be applicable to active-matrix liquid crystal display devices or simple-matrix liquid crystal display devices or those of other types as has been stated previously. In addition, the backlight unit should not be limited to the illustrative one of the so-called side-edge type employing its associative light guide plate as discussed in the above embodiment and may also be applied to other illumination schemes using a plurality of linear light sources or luminescent diode arrays or other similar suitable light source units.

As has been described above, according to the present invention, it is possible to provide an improved liquid crystal display device capable of offering excellent viewing-angle characteristics while improving the use efficiency from the illumination light source to thereby achieve higher brightness under requirement in accordance with an increase in size of liquid crystal panels.

What is claimed is:

1. A liquid crystal display device comprising:
   a pair of substrates opposing each other, at least one of said substrates having thereon an electrode;
   a liquid crystal panel including a liquid crystal layer sandwiched between said pair of substrates;
   an upper polarization plate and a lower polarization plate as arranged causing said liquid crystal panel to reside therebetween;
   control means operatively responsive to receipt of a display image signal for applying a voltage to said electrode;
   a back-light device for illuminating said liquid crystal panel from a back surface thereof;
   a prism sheet provided on an upper surface of said back-light device; and
   a total reflection film disposed between said prism sheet and said liquid crystal panel so as to reflect light from said prism sheet which is reflected in said prism sheet.

2. A liquid crystal display device according to claim 1, wherein said back-light device has a light guide plate with wedge-like cross-section.

3. A liquid crystal display device according to claim 1, wherein said total reflection film includes at least two layers having different refractive indexes from one another.

4. A liquid crystal display device according to claim 1, wherein said total reflection film has at least one conductive film with a voltage applied thereto.

5. A liquid crystal display device according to claim 1, wherein said total reflection film is integral with said lower polarization plate.

6. A liquid crystal display device according to claim 1, wherein said total reflection film reflects light from said prism sheet which is incident upon said total reflection film at at least a predetermined angle with respect to a vertical direction extending from the plane of said total reflection film.

7. A liquid crystal display device according to claim 11, wherein the light reflected from said total reflection film is returned to said prism sheet for reuse for illuminating said liquid crystal panel.

8. A liquid crystal display device comprising:
   a pair of substrates opposing each other, at least one of said substrates having thereon an electrode;
   a liquid crystal panel including a liquid crystal layer sandwiched between said pair of substrates;
   an upper polarization plate and a lower polarization plate as disposed causing said liquid crystal panel to reside therebetween;
   control means operatively responsive to receipt of a display image signal for applying a voltage to said electrode;
   a back-light device for illuminating said liquid crystal panel from a back surface thereof;
   an angle-dependent control film member provided between said liquid crystal panel and said back-light device for angularly controlling output light as emitted from said illumination light source to reach said liquid crystal panel; and
   a total reflection film provided between said angle-dependent control film member and said liquid crystal panel so as to reflect light from said angle-dependent control film member which is reflected in said angle-dependent control film member.

9. A liquid crystal display device according to claim 8, wherein said back-light device has a light guide plate with wedge-like cross-section.

10. A liquid crystal display device according to claim 8, wherein said total reflection film includes at least two layers having different refractive indexes from one another.

11. A liquid crystal display device according to claim 6, wherein said total reflection film has at least one conductive film with a voltage applied thereto.

12. A liquid crystal display device according to claim 8, wherein said total reflection film is integral with said lower polarization plate.

13. A liquid crystal display device according to claim 6, wherein said total reflection film reflects light from said angle-dependent control member which is incident upon said total reflection film at at least a predetermined angle with respect to a vertical direction extending from the plane of said total reflection film.

14. A liquid crystal display device according to claim 13, wherein the light reflected from said total reflection film is returned to said angle-dependent control member for reuse for illuminating said liquid crystal panel.

* * * * *